Figures 1, 2:
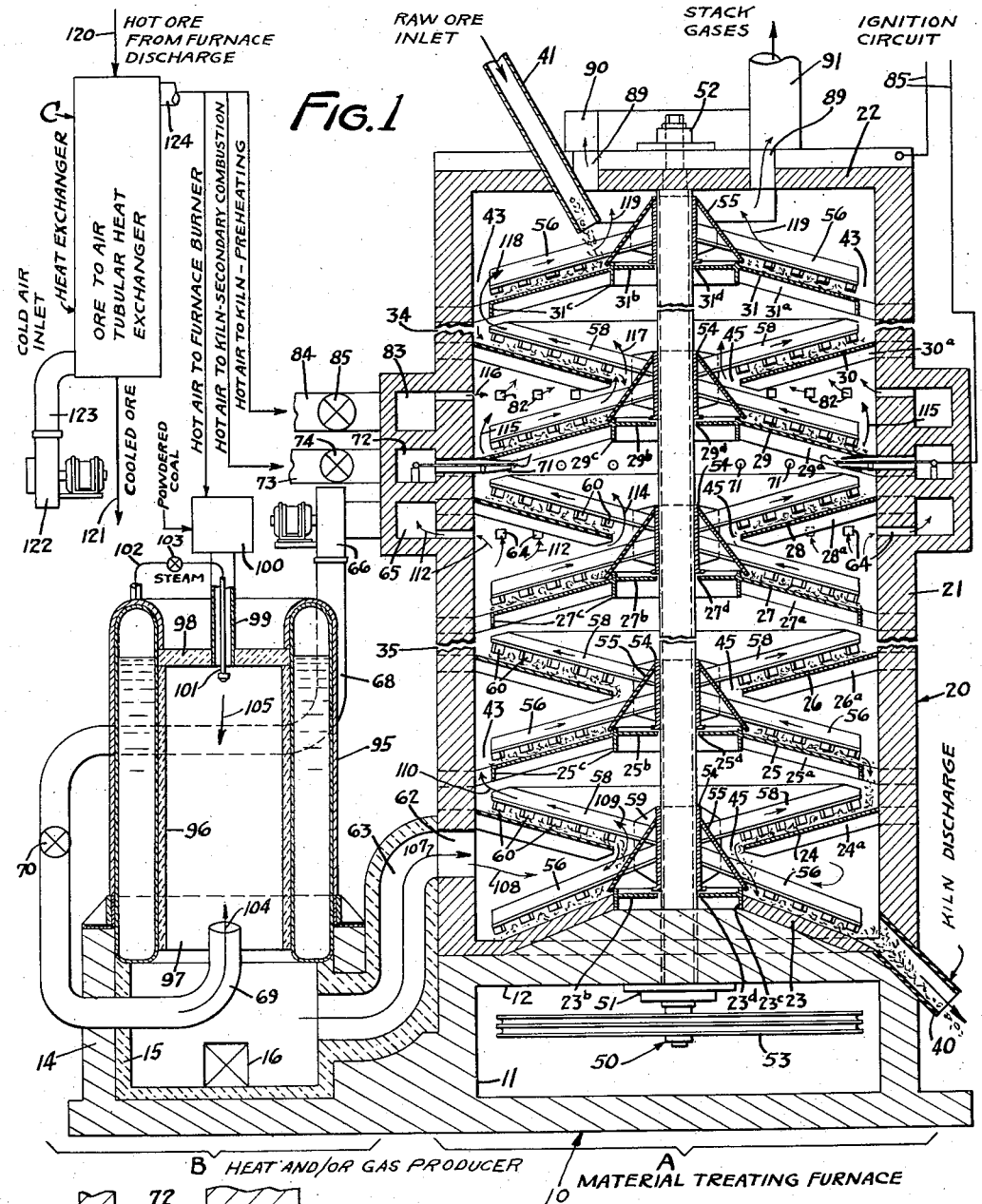

Nov. 2, 1943. H. G. LYKKEN 2,333,111
APPARATUS FOR PROCESSING ORES
Filed Sept. 11, 1941

INVENTOR
HENRY G. LYKKEN

By Paul, Paul + Moore
ATTORNEYS

Patented Nov. 2, 1943

2,333,111

UNITED STATES PATENT OFFICE 2,333,111

APPARATUS FOR PROCESSING ORES

Henry G. Lykken, Minneapolis, Minn.

Application September 11, 1941, Serial No. 410,474

11 Claims. (Cl. 266—29)

This invention relates to improved apparatus for processing ores and materials of like nature, requiring close temperature regulation and close regulation of gaseous atmospheric condition. The invention is particularly adapted for reducing the hematite to magnetite for the purpose of concentrating the ore by magnetic separation, and is equally adaptable for the reduction of ores composed of mixed ferro-manganous ores such as manganous hematite ores. In the case of mixed ferro-manganous ores, the iron oxide is reduced to magnetite $Fe_3O_4$, and the manganese oxides are reduced to MO, the latter being selectively soluble, may be leached out of the magnetite and gangue. The residual magnetite may then be separated from the gangue by usual magnetic separation.

The present invention may, in one of its aspects, be used for the complete, or nearly complete, reduction of high grade iron ore under controlled temperature and atmosphere. Under appropriate conditions there may thus be produced a granulated iron stock for uses such as the cold compression molding of iron, or agglomerated iron stock for uses such as open hearth or electric furnace steel making.

The apparatus of the present invention is particularly adapted for the processing of iron ore in accordance with my Patent No. 2,269,465 Jan. 13, 1942, wherein hematite iron ore is intimately admixed with finely pulverized lignite, or lignitic fuel is mixed with the incoming ore, to supply all or nearly all of the de-oxidizing effect, or the apparatus of the present invention may be used in a combined method wherein a part of the de-oxidizing effect is supplied by a gaseous atmosphere, and a part by pulverized lignitic fuel as set forth in said Patent No. 2,269,465.

The invention is particularly adapted for the treatment of finely divided ores. In many low grade iron ore deposits and dumps the ore is in a state of fine division, some ores having the appearance of red clay. These ores may contain up to 40% iron, but cannot directly be smelted economically because of the large heat loss in melting slagging the non-ferrous constituents of the ore. It is one of the purposes of the present invention to provide an apparatus particularly adapted to the problem of reducing such low grade hematite "fines," so that they may be concentrated by use of a magnetic separator. Thus huge quantities of readily available low grade hematite ores, both low grade stock piles left from previous stripping and mechanical concentrating operations, and natural deposits are made available for concentration.

It is, of course, contemplated that the apparatus may be used for the roasting and processing of other ores as well as for the heat treatment, drying or processing of other materials where close control of temperature and atmospheric conditions are requisite, and that the apparatus may be used for carrying out the herein illustrated methods, and other methods of my co-pending application which continues the method subject matter hereof.

It is accordingly an object of the invention to provide apparatus for treating ores and other materials under closely controlled temperature and atmospheric conditions, and a particular object to provide apparatus for the treatment of low grade hematite ores, either coarse or fines, for converting the hematite constituents of said ores to magnetite, and for treating concentrated or high grade ferrous ores for producing granular or agglomerated iron.

It is a further object of the invention to provide improved apparatus for producing requisite quantities of reducing gases and heat for the reduction of the ores, and for efficiently communicating said reducing agents and heat to the material undergoing treatment under closely controlled gaseous temperature and atmospheric conditions.

It is also an object of the invention to provide apparatus for the elimination of the residual reducing agent during the process by combustion, so as in part to supply heat to the process, and it is an object to provide for recovery of heat from the returned material, and means of returning said heat to the process.

It is also an object of the invention to provide apparatus for producing reducing gases of prescribed analysis at high temperature, and to provide for tempering of such reducing gases prior to communicating the same to the material undergoing treatment, by admixing reducing gases of low temperature withdrawn from a cooled portion of the apparatus.

Other objects of the invention are those inherent in and implied by the invention herein illustrated, described and claimed.

Throughout the drawing, corresponding numerals designate corresponding parts.

The invention is illustrated and described with reference to the accompanying drawing in which, Figure 1 is a view showing certain portions of the apparatus in vertical section, and other portions schematically.

Figure 2 is a fragmentary vertical section through one of the gas-burning tuyères.

Apparatus

The apparatus of the present invention includes a material treating apparatus or kiln shown at the right of Figure 1 above the bracket A, a heat generator or heat generator and gas producer shown at the lower left portion of Figure 1 above the bracket B, a heat exchanger generally designated C, and inter-connecting communicating ducts specifically described hereinafter, for handling the material undergoing treatment, the treating re-agents, the heating gases, steam and the like. The entire apparatus illustrated is a unitary system, in which the several component parts are inter-related so as to produce the end result desired.

The illustrated apparatus of the present invention consists of a foundation 10, provided at the right side, in Figure 1, with a lower opening 11, which is covered by foundation cap 12. Vertically positioned upon the cap 12, there is a kiln cylinder, generally designated 20, having cylindrical wall 21 and a roof 22. The wall and roof are preferably made of brick-work which may include suitable refractory, insulation and structural layers with structural steel framing, if desired. The exact construction of the kiln wall depends upon the working temperatures of the particular process being carried out in the apparatus. The interior portion of the treating cylinder is provided with a number of conical decks, of which an exemplary number of decks 23, 24, 25, 26, 27, 28, 29, 30 and 31 are shown. In the drawing, the kiln wall is shown as broken at 34 and 35, indicating that additional decks may be interposed, if desired.

The decks are conical in shape alternately sloping inward and outward. Thus the odd numbered decks 23, 25, 27, 29 and 31 slope outward, whereas the even numbered decks 24, 26, 28 and 30 slope inward. Each of the decks is suitably supported by a structural frame-work 24a, 25a, 26a, 27a, 28a, 29a, 30a and 31a, the ends of the framework being built into the cylindrical wall 21 of the kiln, so as to give adequate stability and support for the deck surface.

The construction of each deck and its supporting structure depends upon the temperature prevailing in that zone of the kiln. Thus, the lower decks 23 through 26, which are ordinarily at higher temperatures, may have a refractory surfacing and water and air-cooled supporting structures, while the upper decks 27 through 31, which ordinarily are in a lower temperature zone, may be surfaced with ordinary steel, and carried by ordinary structural steel. Of course, in certain of the processes of the present invention, more fully described hereinafter, the maximum temperatures obtaining in the kiln are sufficiently low, so that ordinary structural steel may be used throughout. This is true in the hematite reduction processes for which the apparatus of this invention is especially intended.

The lower deck 23 is provided with one or more discharge openings 40 at its outer periphery, and the roof 22 is provided with a raw material i. e. raw ore inlet 41, the latter being arranged so that the incoming material is discharged near the center of the upper deck 31. The odd numbered decks 31, 29, 27 and 25, have continuous surfaces except for the outer periphery as indicated at 43 on deck 31, and the material undergoing treatment is progressed outwardly along each of these decks, until it falls through the opening 43 onto the next lower deck. The odd numbered decks also have center portions 31b, 29b, 27b and 25b, and stiffening rings 31c, 29c, 27c, 25c and 23c, which serve to stiffen the decks. The even numbered decks 30, and also decks 28, 26, and 24 have a central opening 45, the material being progressed toward the center of each deck until it finally falls through the opening 45 of that deck upon the inner portion of the next lower outwardly sloping deck.

At the axis of the kiln A, there is positioned a vertical shaft, generally designated 50, which is supported at its lower and upper ends by bearings 51 and 52. At the lower end of the vertical shaft 50, there is a large diameter pulley wheel 53 for a slow speed rope drive, and this serves slowly to rotate the shaft 50. The shaft 50 extends vertically through openings 23d, 25d, 27d, 29d and 31d, in the outwardly sloping decks. Immediately above the central portion 23b, 25b, 27b, 29b and 31b, of each of the outwardly sloping decks, there is provided a flanged collar 54 and a conical skirt 55, which prevents the material from piling up at the central portion.

Attached to the flanged collar are a plurality of downwardly sloping rabble arms as illustrated at 56 for deck 23, and a plurality of upwardly sloping rabble arms 58 as illustrated for deck 24. The rabble arms 56 and 58 are stiffened by gusset plates 59, and where the temperature conditions prevailing in the furnace so require, the arms may be made of heat resistant alloy steel, or may be cooled by air or water communicated to the arm through a hollow opening, not illustrated, in the shaft 50. However, for certain uses, the operating temperatures are sufficiently low to permit the use of ordinary structural steel for these parts, and such material is used in preference to the more expensive alloy steel, or in preference to the more complicated cooling arrangement, where the temperature conditions prevailing so permit.

The collars 54 are suitably keyed, pinned, or welded to the shaft 50, and accordingly as the shaft is rotated, the rabble arms sweep over the surface of the associated decks. The slope of each rabble arm is preferably the same as the slope of its associated deck, and the arm is positioned a short distance above the deck, the under-surface of the rabble arm being provided with a plurality of shovels 60, slanted so that as the rabble arm is rotated by shaft 50, the shovel will move the material on the associated deck down the slope toward the discharge opening 43 or 45, depending upon whether the decks slope outwardly or inwardly.

Therefore, the raw material undergoing treatment is slowly progressed downwardly over the deck 31, and thence through opening 43 to deck 30, where it is again slowly progressed down the deck toward the opening 45, and so on over decks 29 through 23 until it is finally discharged through the discharge openings 40.

Between decks 23 and 24, there are arranged one or more inlet openings 62, communicating with the flue 63 from the gas producer B. The openings 62 serve as the inlet for the reducing or treating atmosphere within the kiln. At a higher region in the kiln in the illustrated embodiment, between decks 27 and 28, the kiln wall 21 is provided with a plurality of gas withdrawal openings 64, which extend through the wall to the annular manifold 65. Gas is withdrawn through the openings 64 by means of motor driven blower 66, the outlet of which is connected to the flue 68, extending into the gas producer B as shown at nozzle 69. A regulating damper 70 is preferably provided in the flue 68, so as to allow control and close regulation of the flow of gases.

At a position above the gas withdrawal opening 64, in the illustrated kiln, between decks 28 and 29, the wall 21 is provided with a plurality of inwardly extending tuyères 71 extending from hot air manifold 72 into the interior of the furnace. The manifold 72 is connected to hot air inlet pipe 73, which is provided with a damper 74.

Within the manifold 72, there is positioned a circular busbar 75 of an ignition circuit, the busbar being held in elevated position by insulator 76. Extending axially through each of the tuyère tubes 71, there is an ignitor rod 77, supported by insulator 78, the end of the rod being bent over at 79, so as to be brought into proximity with the edge 80 of the tube 71. The tubes 71 are all grounded to the frame of the apparatus and when a high voltage ignition circuit 85 is connected to the frame of the machine and to busbar 75, a continuous ignition spark is provided at the end of each of the tuyère tubes 71. A blast of air thus emanates from the inner ends of each of the tubes 71, and mixing with the residual combustible gases within the kiln produces a combustible mixture which is ignited by an ignition spark. Residual combustible gases are in that way burned off inside the kiln between decks 28 and 29. The air supply to manifold 72 is by means of tube 73, and is preferably heated as described hereinafter.

At a still more elevated position, in the illustrated kiln, between decks 29 and 30, the burner wall 21 is provided with a plurality of drying air inlets 82 connected with manifold 83. The manifold is, in turn, connected with hot air supply pipe 84. The supply pipe 84 is provided with a damper 85, as shown in Figure 1. The roof 22 is provided with a plurality of flue gas discharge openings 89, which communicate through an annular member 90 to stack 91.

The gas producer B shown at the lower left-hand portion of Figure 1, includes a lower cylindrical turbulence chamber 14, lined with carborundum or other suitable refractory 15. At the bottom of chamber 14 there is a clean-out door 16, normally closed. Resting upon the chamber is a double-walled cylindrical boiler 95, which is lined with carborundum or other suitable refractory material 96. The cylindrical inner opening 97 of the boiler, is closed at its upper end by a cap 98, which is provided with a centrally disposed burner inlet tube 99, emanating from a burner 100. The burner may be adapted for the use of lignitic fuels, coal, coke, pitch, byproduct tar, or fuel oil. Lignitic fuels are preferred in Minnesota because of their good gas-producing qualities, and availability from the Dakota lignite beds.

Centrally within the burner tube 99, there is positioned a steam inlet nozzle 101, which is supplied from boiler 95 through pipe 102, having central control 103. The boiler 95 serves not only as a water jacket for cooling the gas producer unit, but also as a steam boiler for providing processed steam.

The flue 68 terminates at nozzle 69 within the gas producer, and forces its blast of re-circulated gases in the direction of arrow 104, thereby impinging directly against the steam and fuel burner blasts, which are projected in the downward direction indicated by arrow 105. A high turbulence is accordingly induced, thus assuring adequate admixture between the producer gas and the tempering gases injected through the recirculating flue 68. The mixed, tempered gases are communicated to the kiln by means of flue 63, as indicated by arrows 107, where, after entering the kiln, the gas is passed in the direction of arrows 108 alternately through the central openings 45 as indicated by arrow 109, and through the edge openings 43 as indicated by arrows 110, until reaching the space between decks 27 and 28, at which position a portion of the gases are withdrawn through the gas withdrawal opening 64, as indicated by arrows 112. Thence through manifold 65, blower 66 and again through flue 68, through valve 70 and nozzle 69 and into the gas producer.

A portion of the treated gases pass upwardly through the central portion of the deck 28, as indicated by arrows 114, where the combustible constituents are burned off as previously described at the air inlet tuyères 71. The ignited burned-off and hence re-heated gases then pass upwardly through the annular space 43 around deck 29, as indicated by arrows 115, and mix with incoming hot air, which enters the material treating apparatus through the drying air inlet tubes 82, as indicated by the arrows 116, and thence pass upwardly through the central opening 45 of deck 30 as indicated by arrows 117, over the deck 30 and any intermediate drying decks, until finally passing upwardly through the channel 43 around the deck 31 as indicated by arrows 118, thence over the deck 31 and upwardly, as indicated by arrows 119, through openings 89 into manifold 90, and upwardly through the stack 91.

The heat exchanger schematically illustrated, may consist of any suitable solid-gas heat exchanger, for example, a tubular heat exchanger wherein the solid material is passed over the outsides of the tube, and the air or gas being heated through the tubes. The heated material thus emerges from the kiln discharges 40, and goes directly to the heat exchanger C, which the material enters as indicated by the arrows 120. After passing through the heat exchanger, the material is cooled, as indicated by the arrows 121. The heat exchanger is provided with an air inlet blower 122, which forces air through the flue 123, thence through the heat exchanger from which the air emerges heated at outlet 124. The hot air is divided, a first portion passes as indicated by the legend "Hot air to kiln-preheating" to the hot air supply pipe 84; a second portion is conducted as indicated by the legend "Hot air to kiln-secondary combustion" to the air inlet pipe 73, to manifold 72, and thence to the gas burn-off tuyères 71, and a third portion as indicated by the legend "Hot air to furnace burner," is conducted to the burner 100. The fuel is likewise supplied to the burner from any suitable source.

*Operation*

Where the present apparatus is utilized for the reduction of hematite ores to magnetite, the operation is as follows:

The ore is introduced to the raw ore inlet tube 41 whence it passes over the decks 31, 30, 29, 28, 27, 26, 25, 24, and finally over the lower deck 23 out of the furnace discharge pipe 40, the passage of the ore through the material heating apparatus being facilitated as previously described, by the rotation of the rabble arms 56 and 58 of the various decks. Where a small portion of lignite powder is added to the ore, as in my Patent No. 2,269,465, the ore mass appears to become "fluid," that is, it may be stirred and progressed by the rabble arms, and it flows much more easily than where no lignite dust is present. Hence, the lignite serves not only to supply some of the de-oxidizing effect, but also serves to facilitate the flow of ore through the kiln. The gas heat and/or producer B is placed in operation by ignition of the fuel at the burner, the gas producer being preferably started before ore is introduced. While the kiln is being heated to normal operating temperatures, the blower 66 is in operation, and withdraws gases through ports 64 as previously described, and re-circulates these gases through the gas producer and back to the kiln. The gas producer operates at an exceedingly high temperature i. e. 3000-4000° F., and were it not for the gases re-circulated through the flue 68, the gases introduced into the kiln through flue 63, would be several thousands degrees Fahrenheit in temperature, thus causing damage to the kiln and softening the ore when the latter is put through. However, a sufficient quantity of kiln gas is re-circulated, so that the gas flowing along the path of arrow 107 has a temperature of 1000-1500° F. The temperature of the gases in flue 63 is regulated, so that the temperature of the ore on the lower deck 23 is about 750° F. to 800° F., and in some instances up to 850° F., depending on the optimum temperature of the ore. The desideratum is to heat the ore hot enough to react thoroughly but not excessively. The rate of re-circulation through flue 68, is therefore regulated by means of damper 70, so that the desired temperature in flue 63 is attained. Rapid re-circulation likewise tends to decrease the temperature gradient between port 62 and the gas withdrawal ports 64, and accordingly the reduction reaction is maintained nearly maximum throughout the reducing zone, extending from deck 28 to deck 23.

The rate of operation of the burner 100, and the degree of combustion produced by it, likewise effects the temperature in flue 63. Higher rates of operation and greater air supply tend to increase the temperature, whereas lower rates of operation and lesser air supply decrease the temperature. It is, of course, understood that the combustion produced by burner 100 is carried out with insufficient air, so as to yield the desired reducing atmosphere.

Ordinarily, the temperature of gases withdrawn through ports 64 is reduced, so that burning does not automatically occur at tuyères 71. However, a continuous ignition is provided at the tuyères, which enables the burning off operation to proceed even though the temperature of the residual combustible gases in the region between decks 28 and 29, is below the ignition temperature of such gases.

The gas producer operates at high temperatures, and with some added steam provided by means of nozzle 101, yields a reducing gas mixture rich in carbon monoxide and some hydrogen, the percentage of hydrogen being decreased as the temperature of operation of the gas producer is increased. The ore introduced at the raw ore inlet 41, thus passes down through the kiln A, and after being heated in passing over the decks 31, 30 and 29, enters the reducing zone from deck 28 to deck 23. In the reducing zone, the ore is continuously stirred in an atmosphere rich in carbon monoxide and hydrogen, and optionally with an admixed small percentage of lignite dust. The ore is preheated before reaching the reducing zone, where the reducing action is initiated. The ore temperature is gradually increased until it reaches deck 23, at which point the reduction from hematite to magnetite is completed, and the ore is withdrawn. The temperature of the reducing gases entering at port 62, is maintained at a level so as to produce efficient reaction, but not so high as to cause softening of the ore. The range is 750°-800° F., and occasionally with some ores as much as 850°. The type of ore used is of course the determining factor.

It is to be understood, of course, that in the burner 100 the fuel may be powdered coal, coke or lignite, or pitch, tar or fuel oil. By utilizing the refractory material 96 in the gas producer, a high temperature may be maintained, which facilitates the producer gas operation, at the same time the water jacket boiler 95 prevents excessive temperatures, and provides adequate process steam. By re-circulating gases from the kiln, it is possible to maintain the temperature of the gases entering the kiln at a low temperature without wasteful cooling, as would otherwise be required. At the same time, the re-circulation aids greatly in minimizing the temperature gardient in the reducing zone between decks 23 and 28, the gases being re-circulated enter at an appropriate temperature of 1000-1500° F., and are pulled through at a sufficient rate that the temperature does not drop as much as would be the case if no re-circulation was used. Hence, throughout the reducing zone the gaseous and solid de-oxidizing agents are maintained at maximum effectiveness.

About 1,200,000 B. t. u. heat input is required for each ton of hematite ore converted to magnetite ore, and a considerable portion of this heat is recovered by means of the heat exchanger C and this heat is returned to the kiln at the gas burn-off tuyères 71, and at the drying air inlet openings 82. In this way, the residual heat of the ore already reduced is recovered and returned to the process, for bringing the incoming ore up to reaction temperature in the preheating zone from deck 29 to deck 31.

Where the apparatus is used for the complete, or nearly complete, reduction of already concentrated iron ores, slightly higher temperatures are utilized. For such uses the decks and rabble arms are appropriately constructed of heat resistant alloy materials, or are suitably air or water cooled.

For the producing of completely reduced iron ore, the starting material is high grade iron, wherein there is but a small and negligible percentage of gangue. Such ore may be the magnetically separated constituent of low grade hematite ore, which was reduced to magnetite ore as described above.

The high grade ore is fed, as before, through the ore inlet 41, and thence through the kiln. It is preheated in passing from decks 31 down to 28, and then passes to the reducing zone decks 27 through 23, where the reduction is carried to completion by the gaseous and solid (lignitic) de-oxidizing agents. The ore does not melt, but is reduced as granules. The fine division of the ore greatly assists in the diffusion of the de-oxidizing material through the ore, and the lignite, as before, assists in maintaining the granular particles in an apparently "fluid" condition so that flow through the kiln is unimpeded.

Where it is desired to produce agglomerated iron, the granular metallic iron discharged through the kiln opening 40 is conducted directly to a rotary kiln, wherein the temperature is maintained from 1800 to 2000°. At such temperatures the iron is softened sufficiently, and the particles agglomerate into large masses suitable for charging in open hearth or electric, steel making furnaces.

Where the methods and apparatus of the present invention are utilized for the concentrating and separating of the ferrous and manganous constituents of ferro-manganous ore, such as manganiferous hematitic ore of the Minnesota Cuyuna Range, the ore is sent through the treating apparatus in the same manner as ordinary hematite ore. As a result, the manganese oxides are reduced to manganous oxide, MnO, and the hematitic ore is reduced to magnetite $Fe_3O_4$. The ore is then passed through the heat exchanger, and is cooled after which it is subjected to appropriate procedures for separation of the iron and manganese constituents.

Various modifications and changes may be made in the materials, compositions and modes of procedure herein described without departing from the spirit of the invention, some of the features of which are defined in the appended claims as follows.

What I claim is:

1. An apparatus for treating materials under controlled atmospheric and temperature conditions comprising a kiln having inlet and outlet ports, means for progressing through the kiln the material undergoing treatment, and means for passing a reducing gas mixture of controlled composition and temperature through the kiln, including a gas producer for generating said reducing gas mixture of controlled composition at relatively high temperature, and a direct connection gas conduit between the producer and kiln inlet port, and re-circulating means for withdrawing relatively cool reducing gases from a relatively cool section of the kiln, and introducing said cool gases into the relatively high temperature gases of the gas producer, for tempering them prior to introduction into the kiln inlet port.

2. An apparatus for treating ore under controlled atmospheric and temperature conditions comprising a kiln, means for progressing the ore undergoing treatment through the kiln from one end to the other, a gas inlet port near the ore outlet end of the kiln for introducing the controlled treating atmosphere, an outlet port for stack gases near the ore inlet port of the kiln, a gas withdrawal port intermediate the gas inlet and outlet ports, a gas producer for generating the kiln atmosphere at high temperature, connection means from said gas producer to the gas inlet port, and means for admixing the relatively cool gases withdrawn from said gas withdrawal port with the higher temperature gases made in the producer prior to introduction of the admixed tempered gases into the kiln.

3. An apparatus for treating ore under controlled atmospheric and temperature conditions comprising a rabble kiln, means for progressing the ore undergoing treatment through the kiln from one end to the other and for conducting treating gases thru the kiln from one end to the other counter to the ore movement therethru, including an ore inlet at one end and an ore outlet at the other end of the kiln, a gas inlet port near the ore outlet of the furnace for introducing the controlled treating atmosphere, an outlet port for stack gases near the ore inlet of the kiln and gas withdrawal port intermediate the gas inlet and outlet ports for withdrawing reducing gases for recirculation through said kiln, said kiln also including an air inlet tuyère between the gas withdrawal port and the gas outlet port of the kiln for burning-off residual combustible gases within said kiln.

4. An apparatus for treating ore under controlled atmospheric and temperature conditions comprising a kiln, means for progressing the ore undergoing treatment through the kiln from one end to the other and for conducting treating gases thru the kiln from one end to the other counter to the ore movement therethru, including an ore inlet at one end and an ore outlet at the other end of the kiln, a gas inlet port near the ore outlet of the kiln for introducing the controlled treating atmosphere, an outlet port for stack gases near the ore inlet of the kiln and a gas withdrawal port intermediate the gas inlet and outlet ports, said kiln also including an air inlet tuyère between the gas withdrawal port and the outlet port of the kiln and ignition means adjacent said tuyère within the kiln for igniting and burning-off residual combustible gases in said kiln.

5. An apparatus for treating ore under controlled atmospheric and temperature conditions comprising a rabble kiln including a vertical column having vertically spaced rabble decks therein, every other deck being provided with central openings, and the intervening decks being provided with peripheral openings, means for introducing ore on the top deck and for progressing the ore in a thin layer across said deck while stirring the ore until the ore reaches the opening in said deck and drops through upon the next lower deck, and then across the next succeeding decks in sequence until the ore is discharged, means for introducing reducing gases near the ore discharge, and for progressing said gases over and through each deck successively and then withdrawing said gases from the kiln near the ore inlet, said apparatus also including means for withdrawing reducing gases from near the periphery of one of the intermediate decks having a central opening.

6. The apparatus of claim 5 further characterized in that means is provided for introducing hot air into the kiln space between the position of the reducing gas withdrawal means and the ore inlet for burning-off residual combustible gases.

7. The apparatus of claim 5 further characterized in that a first hot air inlet means is provided for introducing hot air into the kiln space between the position of reducing gas withdrawal and the ore inlet for burning-off residual combustible gases within the kiln and additional hot air inlet means between the burn-off position and ore inlet for introducing hot air for preheating said ore.

8. An apparatus for treating ore such as hematite or manganiferous hematite ores, under controlled conditions of atmosphere and temperature for reducing said ores prior to concentration including ore treating kiln means, gas producer means and heat exchanger means all interconnected, said kiln means comprising a casing having an ore inlet and an ore outlet, means for moving the ore slowly from the inlet to the outlet, while exposing the ore in a thin layer, a gas inlet near the ore outlet and a gas outlet near the ore inlet, a gas withdrawal port between the gas inlet and outlet, and a tuyère for introducing hot air into the furnace for burning off residual combustible gases in the furnace adjacent said tuyère; said gas producer comprising means for burning carbonaceous fuel at high temperature with insufficient air, for producing a controlled reducing atmosphere, and said heat exchanger comprising means for transferring heat from hot ore to air, a gas conduit connecting the outlet of the gas producer to the gas inlet of the kiln, a gas flue and blower means connecting the kiln gas withdrawal port and the producer, for withdrawing relatively cool gases from the withdrawal ports, and injecting said gases into the high temperature producer gases for tempering the same, and conduit and blower means connecting the heat exchanger and tuyère for transferring heated gases from the heat exchanger to the tuyères and to said gas producer.

9. The apparatus of claim 8 further characterized by having a hot air inlet into the kiln between the tuyère and gas outlet of the furnace and hot air conduit between heat exchanger and said hot air inlet for conducting hot air from the former to the latter.

10. The apparatus of claim 8 further characterized by having ignitor means adjacent the tuyère within the kiln for igniting the mixture of air and residual combustible gas adjacent said tuyère.

11. The apparatus of claim 8 further characterized by having the conduit connecting the gas withdrawal port and gas producer positioned to inject the withdrawn gases directly into the gas producer for producing a condition of turbulence within the producer.

HENRY G. LYKKEN.

CERTIFICATE OF CORRECTION.

Patent No. 2,333,111.  November 2, 1943.

HENRY G. LYKKEN.

It is hereby certified that error appears in the printed specification of the above numbered patent requiring correction as follows: Page 3, first column, line 66, for the words "central control 103" read --control valve 103--; page 4, second column, line 69-70, for "deoxididing" read --deoxidizing--; page 5, first column, line 72, same page, second column, line 75, page 6, first column, line 1, and second column, line 2, for "furnace" read --kiln--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.